(12) United States Patent
Hamilton, II et al.

(10) Patent No.: US 8,773,381 B2
(45) Date of Patent: Jul. 8, 2014

(54) TIME-BASED CONTEXTUALIZING OF MULTIPLE PAGES FOR ELECTRONIC BOOK READER

(75) Inventors: Rick A. Hamilton, II, Charlottesville, VA (US); Andrew R. Jones, Round Rock, TX (US); Mauro Marzorati, Lutz, FL (US); Brian M. O'Connell, Cornwallis, NC (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 13/410,705

(22) Filed: Mar. 2, 2012

(65) Prior Publication Data

US 2013/0229358 A1 Sep. 5, 2013

(51) Int. Cl.
*G09G 5/00* (2006.01)

(52) U.S. Cl.
USPC .......................... 345/173; 715/863; 715/864

(58) Field of Classification Search
USPC ................................. 345/173; 715/863, 864
See application file for complete search history.

(56) References Cited

U.S. PATENT DOCUMENTS

| 2003/0020687 | A1 | 1/2003 | Sowden et al. | |
|---|---|---|---|---|
| 2003/0048250 | A1* | 3/2003 | Boon et al. | 345/156 |
| 2003/0048305 | A1* | 3/2003 | Liang et al. | 345/776 |
| 2008/0040692 | A1 | 2/2008 | Sunday et al. | |
| 2008/0259057 | A1 | 10/2008 | Brons | |
| 2010/0123686 | A1 | 5/2010 | Klinghult et al. | |
| 2010/0175018 | A1* | 7/2010 | Petschnigg et al. | 715/776 |
| 2010/0245296 | A1 | 9/2010 | Sip et al. | |
| 2010/0302128 | A1 | 12/2010 | Lin | |
| 2011/0039602 | A1 | 2/2011 | McNamara et al. | |
| 2011/0234515 | A1* | 9/2011 | Kamijima | 345/173 |
| 2011/0296351 | A1* | 12/2011 | Ewing et al. | 715/841 |
| 2012/0036435 | A1* | 2/2012 | Yang et al. | 715/702 |
| 2012/0069056 | A1* | 3/2012 | Ito | 345/684 |
| 2012/0240041 | A1* | 9/2012 | Lim et al. | 715/702 |

OTHER PUBLICATIONS

Tajika, et al.; Intuitive Page-turning Interface of E-books on Flexible E-paper based on User Studies; MM '08, Oct. 26-31, 2008, Vancouver, British Columbia, Canada; pp. 793-796.
Mars Report; Musings from Mars; Discover a Treasure Trove of iPhone eReader Software, Part 1: Eight Apps for Reading Books; Oct. 14, 2008; http://www.musingsfrommars.org; 24 pages. (printed); retrieved from the Internet Jul. 18, 2011.
Office Action Mail Date Nov. 6, 2013 for U.S. Appl. No. 13/425,600, filed Mar. 21, 2012, Conf No. 9357.
Response filed Dec. 11, 2013 for U.S. Appl. No. 13/425,600, filed Mar. 21, 2012, Conf No. 9357.

(Continued)

*Primary Examiner* — Tom Sheng
(74) *Attorney, Agent, or Firm* — Schmeiser, Olsen & Watts, LLP; Matthew H. Chung

(57) ABSTRACT

A system and associated method for contextualizing a page turn in an electronic book pursuant to a snap gesture made by a user on a touch screen of a tablet device, as performed by an e-reader program running in the tablet device. The snap gesture is quantified with data elements including linger time and direction of the snap gesture. The quantified snap gesture is utilized in identifying a target page number to display on the touch screen responsive to at least one predefined data element of the quantified snap gesture such that the user is enabled to turn multiple pages of the electronic book by the snap gesture as turning multiple pages of a paper book.

16 Claims, 5 Drawing Sheets

(56) References Cited

OTHER PUBLICATIONS

Patent application for U.S. Appl. No. 14/225,841, filed: Mar. 26, 2014, Conf No. 1025.

RCE and response (Filed Mar. 28, 2014) for U.S. Appl. No. 13/425,600, filed Mar. 12, 2012. Conf. No. 9357.

Advisory Action (Mailed Mar. 26, 2014) for U.S. Appl. No. 13/425,600, filed Mar. 12, 2012, Conf. No. 9357.

* cited by examiner

TIME-BASED CONTEXTUALIZING OF MULTIPLE PAGES FOR ELECTRONIC BOOK READER

BACKGROUND

The present invention discloses a system and associated method for grouping multiple pages of an electronic book proportional to a gesture of a user interacting through a touch screen with an electronic book reader application, which improves user-friendliness of the e-book reader application by making browsing the e-book feel like browsing of traditional books. Conventional e-reader applications support sequential turning of pages one by one, forward or backward, going directly to a beginning or an end of a document, or directly turning to a specific page when the user provides a page number in a document.

BRIEF SUMMARY

According to one embodiment of the present invention, a method for contextualizing a page turn in an electronic book pursuant to a snap gesture made by a user on a touch screen of a tablet device, wherein said method is performed by an e-reader program running in the tablet device, said method comprises: quantifying the snap gesture, responsive to receiving the snap gesture via the touch screen, wherein the quantified snap gesture comprises a first data element of direction of the snap gesture (Dr) and a second data element of linger time of the snap gesture (LT); identifying a target page number for the page turn in the electronic book by use of the quantified snap gesture; and displaying, on the touch screen, a target page of the electronic book that corresponds to the target page number from said identifying.

According to one embodiment of the present invention, a computer program product comprises a computer readable memory unit that embodies a computer readable program code. The computer readable program code contains instructions that, when run by a processor of a computer system, implement contextualizing a page turn in an electronic book pursuant to a snap gesture made by a user on a touch screen of a tablet device.

According to one embodiment of the present invention, a computer system comprises a processor, a memory coupled to the processor, and a computer readable storage device coupled to the processor, said storage device containing program code configured to be executed by the processor via the memory to implement contextualizing a page turn in an electronic book pursuant to a snap gesture made by a user on a touch screen of a tablet device.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing contextualizing a page turn in an electronic book pursuant to a snap gesture made by a user on a touch screen of a tablet device.

DETAILED DESCRIPTION

Figure 1:
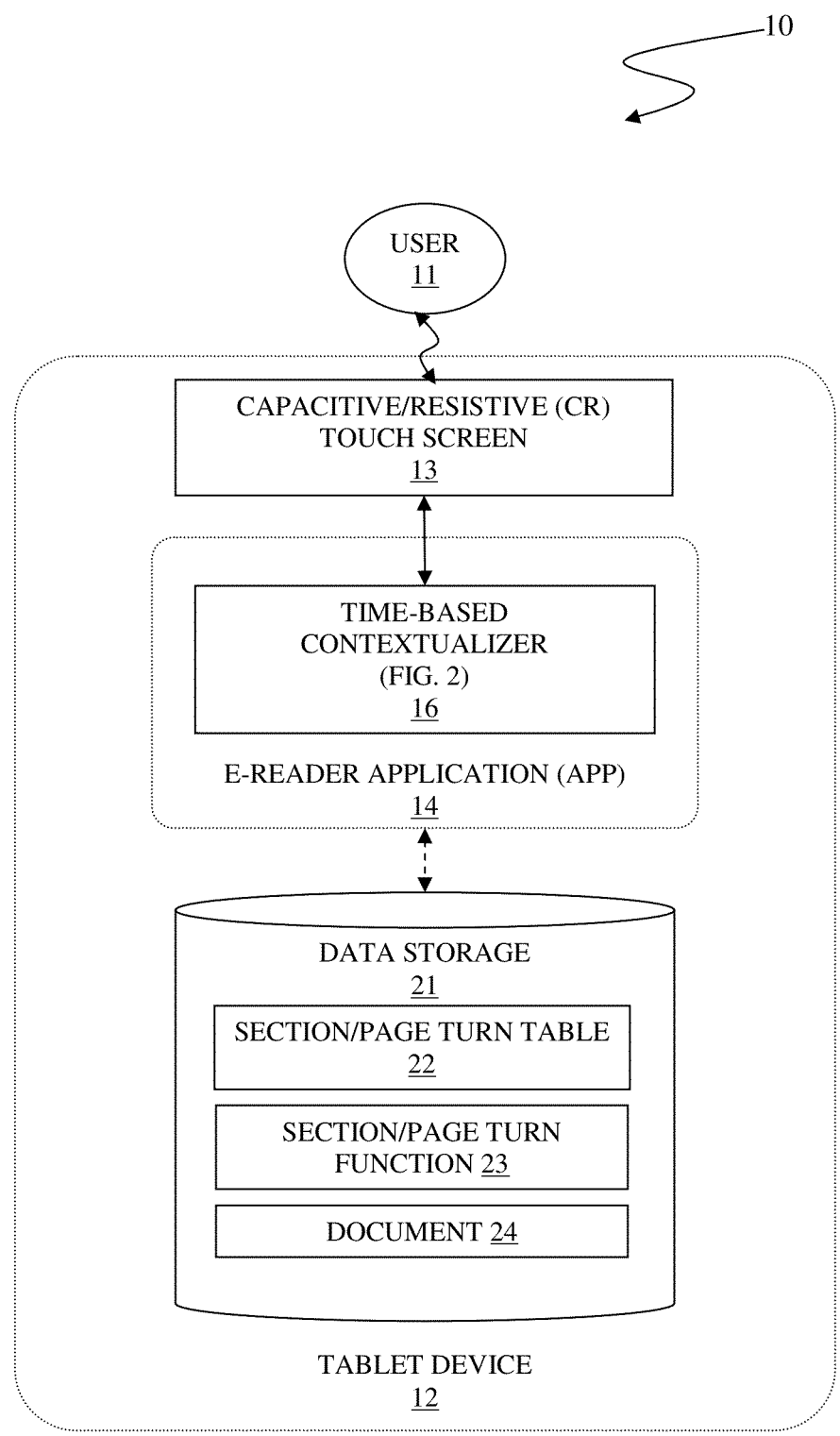
FIG. 1 illustrates a system 10 for time-based contextualizing of multiple pages for an e-reader application 14 employed in a tablet device 12, in accordance with embodiments of the present invention.

FIG. 1 illustrates a system 10 for time-based contextualizing of multiple pages for an e-reader application 14 employed in a tablet device 12, in accordance with embodiments of the present invention.

The system 10 comprises a user 11 and the tablet device 12. The tablet device 12 comprises a capacitive/resistive (CR) touch screen 13, the e-reader application 14 and data storage 21. The user 11 operates the e-reader application 14 by interacting with the CR touch screen 13 in accessing documents stored in the data storage 21.

The CR touch screen 13 is a touch screen of a type utilizing capacitance or resistance property of electricity. The CR touch screen 13 recognizes a location where the user 11 contacts on the CR touch screen 13, and duration how long the user 11 continues the contact made on respective locations. The user 11 may use, inter alia, a finger, a stylus, etc., in making the touch motions on the CR touch screen 13.

The e-reader application 14 comprises a time-based contextualizer 16 which enables the user 11 to turn arbitrary number of pages of the document by interacting with the CR touch screen 13 with a snap gesture. The snap gesture comprises an initial contact and a sweeping motion, wherein the initial contact is made upon the user 11 touching the CR touch screen 13 at a contact point, and wherein the sweeping motion refers to a unidirectional movement of the contact point along the CR touch screen 13 following the initial contact. The CR touch screen 13 captures the snap gesture data and subsequently transfers the captured snap gesture data to the e-reader application 14. In this specification, the snap gesture data comprises linger time (LT), direction (Dr), and distance (D), wherein LT is defined as a period of time during the user 11 lingers on the contact point, calculated as a difference between the time of the initial contact (T0) and the beginning of the sweeping motion (T1), that is LT=(T1−T0), wherein Dr is selected from a group consisting of {forward, backward} indicating the direction of the sweeping motion, and wherein D is defined as a track length of the sweeping motion on the CR touch screen 13. See FIG. 2 infra for steps performed by the time-based contextualizer 16.

The data storage 21 comprises a section/page turn table 22, a section/page turn function 23, and a document 24. The document 24 is an electronic book displayed on the CR touch screen 13 that the user 11 is viewing and turning pages with snap gestures. The section/page turn table 22 and the section/page turn function 23 are utilized by the e-reader application 14 to calculate a number of pages to turn based on LT, Dr, and D of the snap gesture data captured by the CR touch screen 13 as currently given by the user 11. In this specification, the term "section" is used to indicate a subcomponent of the document 24 that divides the document 24 into disjoint groups of pages, and is used interchangeably with any other term indicating such subunit of the document such as, inter alia, part, chapter, etc.

The section/page turn table 22 and the section/page turn function 23 are employed in calculating the number of pages to turn by the time-based contextualizer 16. See descriptions of FIG. 2 infra for details of the section/page turn table 22 and the section/page turn function 23 as used by the time-based contextualizer 16.

Figure 2:
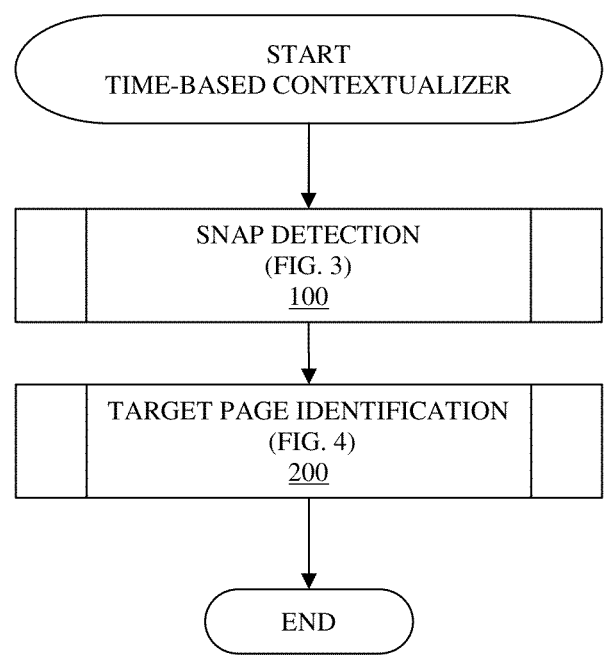
FIG. 2 is a flowchart depicting a method for time-based contextualizing of multiple pages for the e-reader application in FIG. 1, as performed by the time-based contextualizer, in accordance with the embodiments of the present invention.

FIG. 2 is a flowchart depicting a method for time-based contextualizing of multiple pages for the e-reader application in FIG. 1 supra, as performed by the time-based contextualizer, in accordance with the embodiments of the present invention.

In step 100, the time-based contextualizer detects snap gesture made by the user. See description of FIG. 3 infra for detailed operations of step 100. Then the time-based contextualizer proceeds with step 200.

In step 200, the time-based contextualizer identifies a target page of the document to display in accordance with the snap gesture detected from step 100 supra. See description of FIG. 4 infra for detailed operations of step 200. Then the time-based contextualizer terminates processing the snap gesture.

Figure 3:
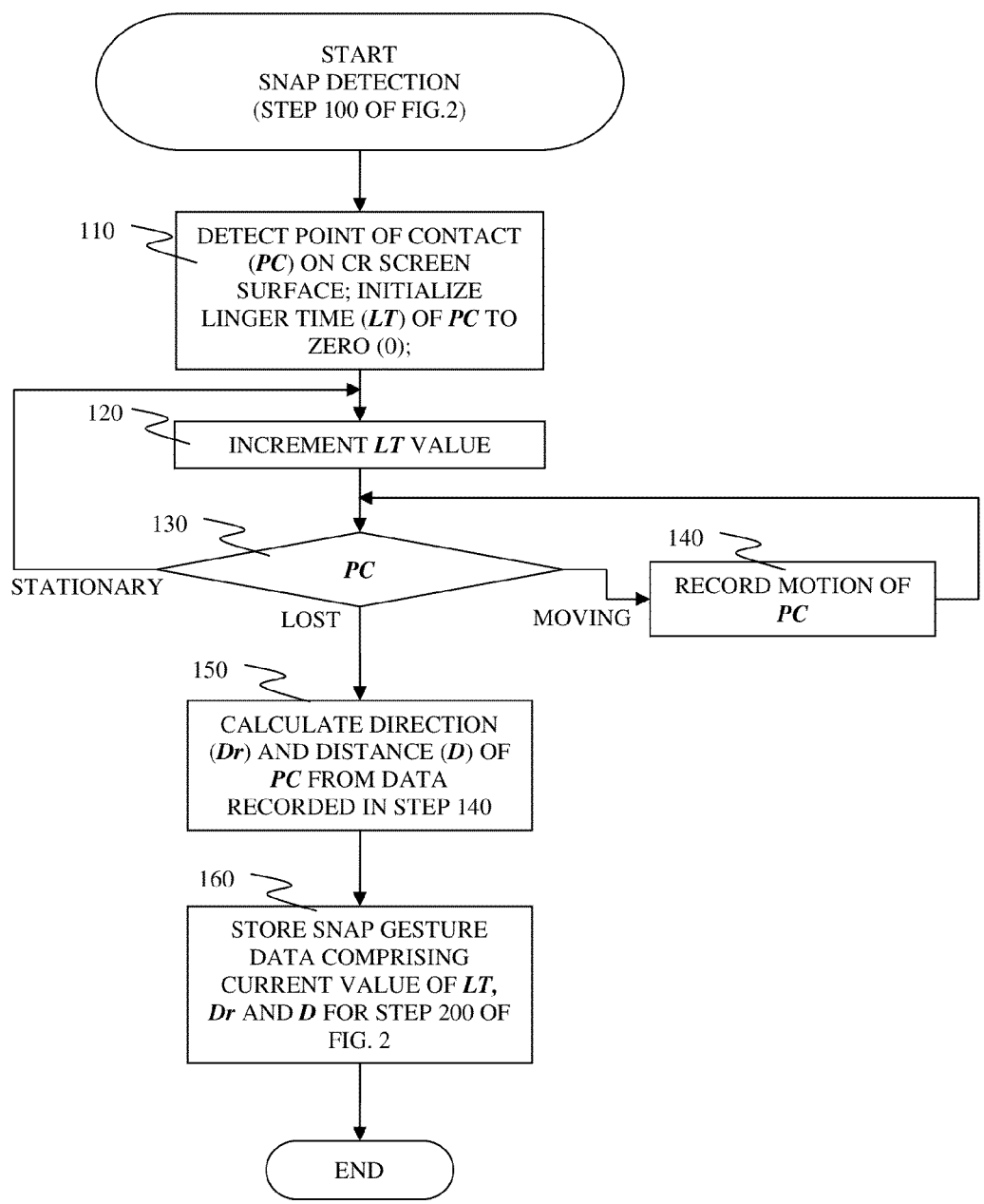
FIG. 3 is a flowchart depicting snap detection performed by the time-based contextualizer in step 100 of FIG. 2, in accordance with the embodiments of the present invention.

FIG. 3 is a flowchart depicting snap detection performed by the time-based contextualizer in step 100 of FIG. 2 supra, in accordance with the embodiments of the present invention.

In step 110, the time-based contextualizer detects a point of contact (PC) for the snap gesture on the capacitive/resistive (CR) touch screen of the tablet device, on which the user interacts with the tablet device for page turning. Then the time-based contextualizer proceeds with step 120.

Steps 120 through 140 are repeatedly performed while the PC exists, that is while the user maintains a continuous contact on the CR touch screen. The time-based contextualizer initializes linger time (LT) value of the PC to zero (0) only when the time-based contextualizer proceeds with step 120 from step 110 supra. Upon losing the PC indicating that the user discontinues the contact detected as the PC in step 110 supra, then the time-based contextualizer proceeds with step 150 infra.

In step 120, the time-based contextualizer increments the LT value by one (1) to represent a lapse of one (1) predefined time unit. In other embodiment of the present invention, the LT value may be incremented by other predefined number for a fixed number of clock cycles. Then the time-based contextualizer proceeds with step 130.

In step 130, the time-based contextualizer determines whether or not the PC makes the sweeping motion of the snap gesture by moving on the CR touch screen surface. If the time-based contextualizer determines that the PC moves on the CR touch screen surface, then the time-based contextualizer proceeds with step 140. If the time-based contextualizer determines that the PC stands still on the CR touch screen surface, then the time-based contextualizer loops back to step 120.

In step 140, the time-based contextualizer records the sweeping motion of the snap gesture as determined in step 130 supra. Then the time-based contextualizer loops back to step 130.

In step 150, the time-based contextualizer calculates direction (Dr) value and distance (D) value of the snap gesture, respectively, based on sweeping motion data recorded in step 140 supra, because a current snap gesture has concluded by the user. Then the time-based contextualizer proceeds with step 160.

In step 160, the time-based contextualizer stores Dr value, D value, respectively calculated from step 150, and LT value resulting from at least one run of step 120 as data associated with the current snap gesture and make the current snap gesture data values available to step 200 of FIG. 2 supra for target page identification. Then the time-based contextualizer proceeds with step 200 of FIG. 2 supra.

Figure 4:
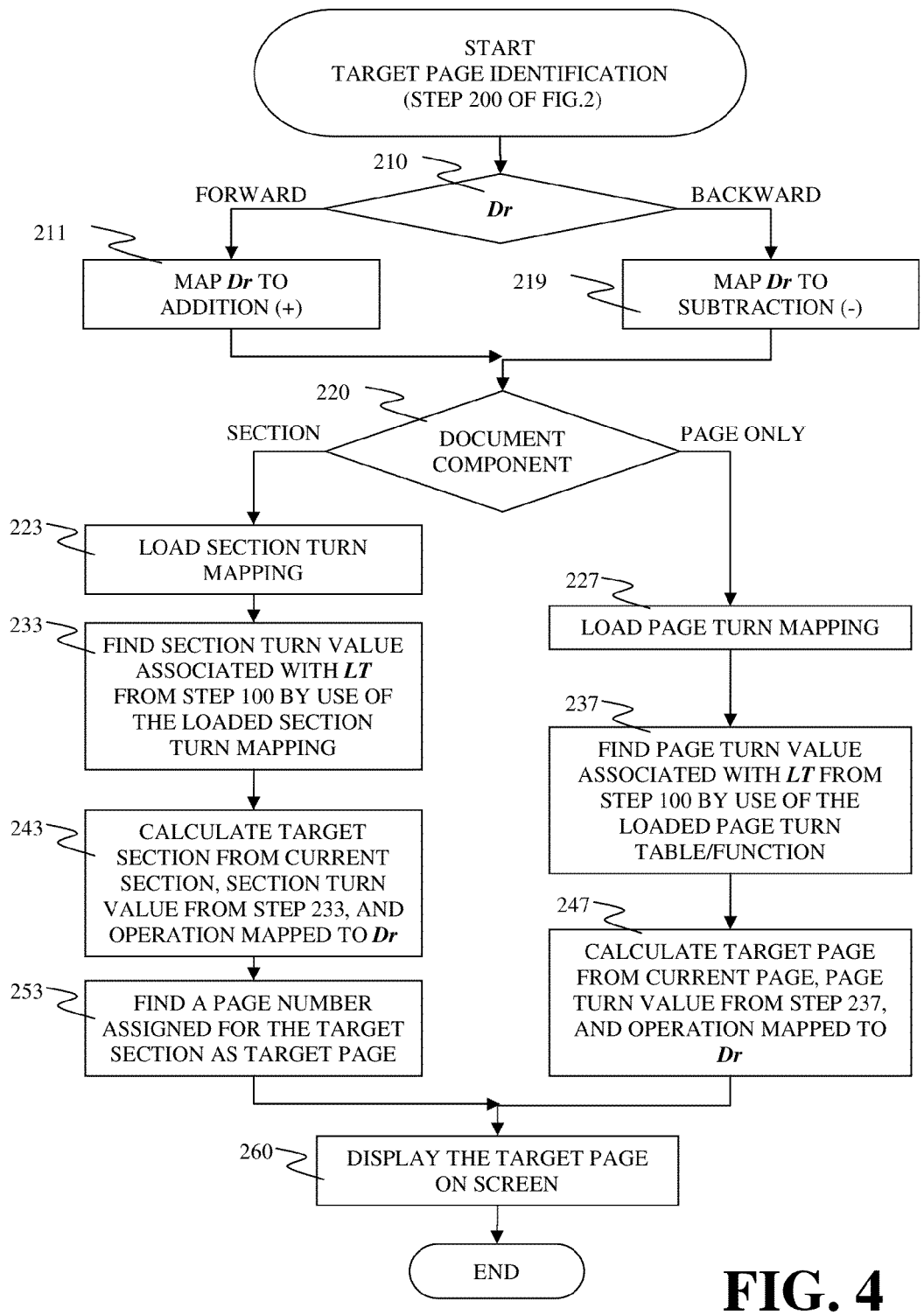
FIG. 4 is a flowchart depicting target page identification performed by the time-based contextualizer in step 200 of FIG. 2, in accordance with the embodiments of the present invention.

FIG. 4 is a flowchart depicting target page identification performed by the time-based contextualizer in step 200 of FIG. 2 supra, in accordance with the embodiments of the present invention.

In step 210, the time-based contextualizer determines whether Dr value of the snap gesture data generated in step 100 of FIG. 1 supra is either "forward" or "backward". If the time-based contextualizer determines that the Dr value of the snap gesture data is "forward", then the time-based contextualizer proceeds with step 211. If the time-based contextualizer determines that the Dr value of the snap gesture data is "backward", then the time-based contextualizer proceeds with step 219.

In step 211, the time-based contextualizer maps the Dr value to a mathematical addition (+) operation for following steps as the snap gesture is directed forward as represented by the Dr value "forward". Then the time-based contextualizer proceeds with step 220.

In step 219, the time-based contextualizer maps the Dr value to a mathematical subtraction (−) operation for following steps as the snap gesture is directed backward as represented by the Dr value "backward". Then the time-based contextualizer proceeds with step 220.

In step 220, the time-based contextualizer determines whether or not the document is organized in sections grouping pages into disjoint groups. If the time-based contextualizer determines that the document is organized in sections as the disjoint groups of pages, then the time-based contextualizer proceeds with step 223. If the time-based contextualizer determines that the document is not organized in subcomponent but has only pages, then the time-based contextualizer proceeds with step 227. In other embodiment of the present invention, wherein the document has more than two subcomponents hierarchically grouping pages, steps 223, 233, 243, and 253 are repeated as a unit for a next level of subcomponent of the document until the time-based contextualizer finds a target page.

In step 223, the time-based contextualizer loads a section turn mapping selected from a section turn table and a section turn function, from the data storage to memory. In one embodiment of the present invention, either a section turn table or a section turn function is implemented for the time-based contextualizer to map the snap gesture to a respective section turn value. In another embodiment of the present invention, both the section turn table and the section turn function are implemented and the user selects which one to use in configuration settings of the tablet device. In the same embodiment, the section turn table consists of four (4) section turn table records, {0, 0.1, 1}, {0.1, 0.2, 2}, {0.2, 0.5, 5}, and {0.5, MaxLT, MaxSecTrn}, wherein first two columns of a section turn table record represent a respective range of linger time (LT) values, wherein a first column represents a lower bound of the respective range of LT values, wherein a second column represents an upper bound of the respective range of LT values, and a third column represents a section turn value corresponding to the first two columns of the respective section turn table record, such that a first section turn table record {0, 0.1, 1} indicates that a first range of LT values between zero (0) and 0.1 seconds corresponds to a first section turn value of one (1), a second section turn table record {0.1, 0.2, 2} indicates that a second range of LT values between 0.1 and 0.2 seconds corresponds to a second section turn value of two (2), a third section turn table record {0.2, 0.5, 5} indicates that a third range of LT values between 0.2 and 0.5 seconds corresponds to a third section turn value of five (5), and a fourth section turn table record {0.5, MaxLT, MaxSecTrn} indicates that a fourth range of LT values greater than 0.5 seconds up to a predefined maximum linger time value MaxLT corresponds to a fourth section turn value of a maximum number of section turns in the document MaxSecTrn. In another embodiment of the present invention, the section turn function maps LT to a section turn value associated with each LT, that is, $f(LT) \rightarrow SecTrn$, wherein LT represents a value from Linger Time domain, and wherein SecTrn represents a value from Section Turn domain. Then the time-based contextualizer proceeds with step 233.

In step 233, the time-based contextualizer finds a section turn value associated with LT of the snap gesture in the section turn mapping loaded in step 223 supra. Then the time-based contextualizer proceeds with step 243.

In step 243, the time-based contextualizer calculates a target section based on a current section, the section turn value from step 233 supra, and the operation mapped in steps 210, 211 or 219 supra, wherein the current section indicates a section value in the document at time of detecting the snap gesture. Then the time-based contextualizer proceeds with step 253.

In step 253, the time-based contextualizer determines a predefined page number in the target section as a target page to display. The predefined page number may be, inter alia, a random page number within the target section, a smallest page number of the target section, etc. Then the time-based contextualizer proceeds with step 260.

In step 227, the time-based contextualizer loads a page turn mapping for following steps. In one embodiment of the present invention, a page turn table consists of four (4) page turn table records, {0, 0.1, 5}, {0.1, 0.2, 10}, {0.2, 0.5, 15}, and {0.5, MaxLT, MaxPgTrn}, wherein first two columns of a page turn table record represent a respective range of linger time (LT) values, wherein a first column represents a lower bound of the respective range of LT values, wherein a second column represents an upper bound of the respective range of LT values, and a third column represents a page turn value corresponding to the first two columns of the respective page turn table record, such that a first page turn table record {0, 0.1, 5} indicates that a first range of LT values between zero (0) and 0.1 seconds corresponds to a first page turn value of five (5), a second page turn table record {0.1, 0.2, 10} indicates that a second range of LT values between 0.1 and 0.2 seconds corresponds to a second page turn value of ten (10), a third page turn table record {0.2, 0.5, 15} indicates that a third range of LT values between 0.2 and 0.5 seconds corresponds to a third page turn value of fifteen (15), and a fourth section turn table record {0.5, MaxLT, MaxPgTrn} indicates that a fourth range of LT values greater than 0.5 seconds up to a predefined maximum linger time value MaxLT corresponds to a fourth page turn value of a maximum number of page turns in the document MaxPgTrn. For the same embodiment wherein a page turn function is utilized, the page turn function of LT maps to a page turn value for each LT, that is, $f(LT) \rightarrow PgTrn$, wherein LT represents a value from Linger Time domain, and wherein PgTrn represents a value from Page Turn domain. Then the time-based contextualizer proceeds with step 237.

In step 237, the time-based contextualizer finds a page turn value associated with LT of the snap gesture in the page turn mapping loaded in step 227 supra. Then the time-based contextualizer proceeds with step 247.

In step 247, the time-based contextualizer calculates a target page to based on a current page, the page turn value from step 237 supra, and the operation mapped in steps 210, 211 or 219 supra, wherein the current page indicates a page number value in the document at time of detecting the snap gesture. If the operation is an addition, then the target page results from advancing the page turn value from the current page. If the operation is a subtraction, then the target page results from taking the page turn value from the current page such that the page advancement is reversed. Then the time-based contextualizer proceeds with step 260.

In step 260, the time-based contextualizer display the target page calculated in step 253 or step 247, supra, on the CR touch screen of the tablet device. Then the time-based contextualizer terminates processing the current snap gesture.

Figure 5:
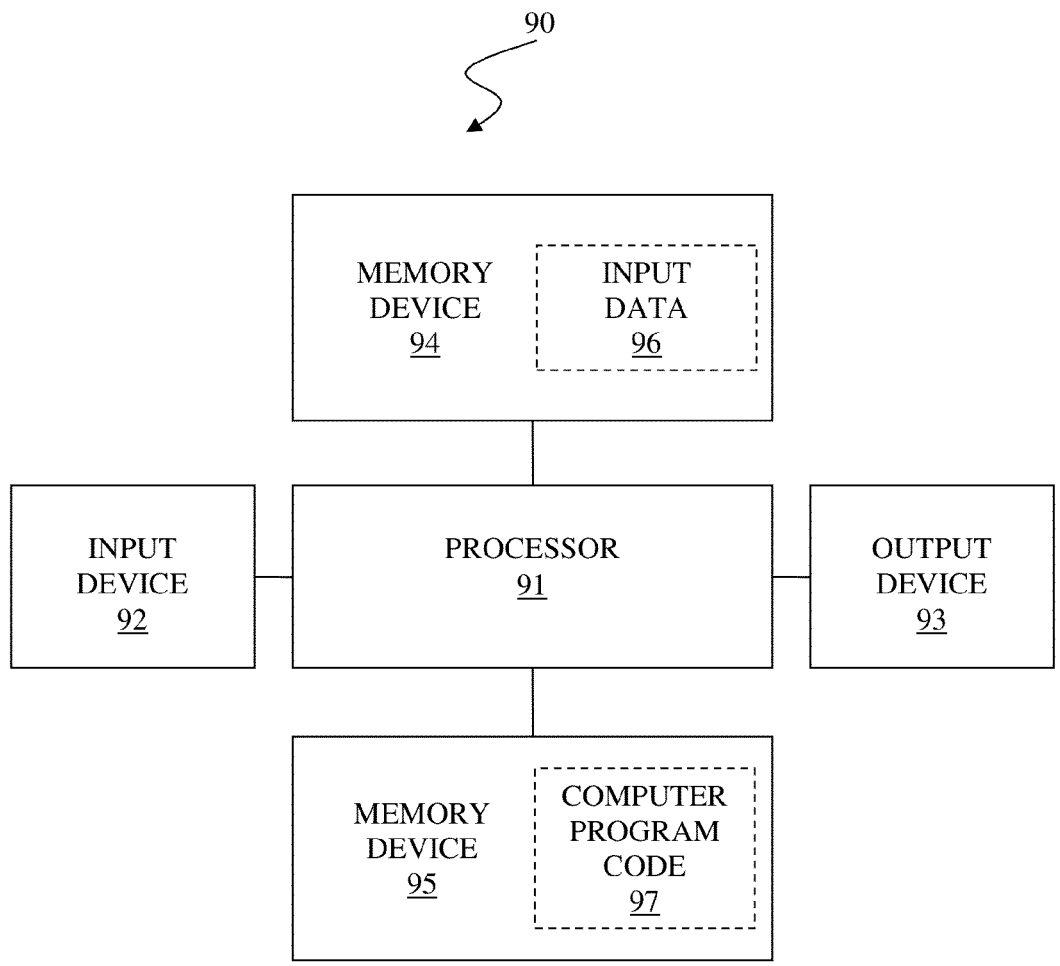
FIG. 5 illustrates a computer system 90 used for time-based contextualizing of multiple pages for an e-reader application employed in a tablet device, in accordance with the embodiments of the present invention.

FIG. 5 illustrates a computer system 90 used for time-based contextualizing of multiple pages for an e-reader application employed in a tablet device, in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for time-based contextualizing of multiple pages for the e-reader application of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for time-based contextualizing of multiple pages for the e-reader application.

In another embodiment, the invention provides a method that performs the process steps of the invention on a subscription, advertising and/or fee basis. That is, a service provider, such as a Solution Integrator, can offer to create, maintain, support, etc., a process for time-based contextualizing of multiple pages for the e-reader application of the present invention. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represents a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for contextualizing a page turn in an electronic book pursuant to a snap gesture made by a user on a touch screen of a tablet device, wherein said method is performed by an e-reader program running in the tablet device, said method comprising:

quantifying the snap gesture, responsive to receiving the snap gesture via the touch screen, wherein the quantified snap gesture comprises a first data element of direction of the snap gesture (Dr) and a second data element of linger time of the snap gesture (LT), and wherein said quantifying comprises:

detecting a point of contact that initiates the snap gesture on the touch screen at a first point in time T0, wherein the touch screen is a capacitive-resistive type such that the touch screen provides data pertinent to capacity and resistance of the point of contact to the e-reader program;

recording movement of the point of contact, upon determining that the point of contact starts moving at a second point in time T1, while the point of contact exists on the touch screen, wherein T1 is greater than T0;

calculating LT as being equal to (T1−T0);

calculating Dr from the recorded movement of the point of contact, wherein the calculated Dr is selected from a group consisting of {forward, backward}; and storing the calculated Dr and LT as the quantified snap gesture such that the e-reader program utilizes the stored Dr and LT in said identifying;

identifying a target page number for the page turn in the electronic book by use of the quantified snap gesture; and displaying, on the touch screen, a target page of the electronic book that corresponds to the target page number from said identifying.

2. The method of claim 1, said quantifying further comprising:

calculating a third data element of distance of the snap gesture (D) indicating a track length made by the point of contact during said recording the movement, that is (T2−T1), wherein T2 is a third point in time on which the point of contact is lost, wherein T2 is greater than T1; and storing the calculated D, Dr, and LT as the quantified snap gesture such that the e-reader program utilizes the stored D, Dr, and LT in said identifying.

3. The method of claim 1, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in sections grouping pages into disjoint sets within the electronic book;

discovering a section turn value corresponding to the quantified snap gesture;

calculating a target section number by applying the mathematical operation corresponding to Dr from said mapping to a current section value and the discovered section turn value, wherein the current section value is a section value being displayed when the snap gesture is received; and selecting the target page number in the calculated target section number pursuant to a predefined manner.

4. The method of claim 1, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in disjoint pages within the electronic book; and discovering a page turn value corresponding to the quantified snap gesture;

calculating a target page number by applying the mathematical operation corresponding to Dr from said mapping to a current page value and the discovered page turn value, wherein the current page value is a page value being displayed when the snap gesture is received.

5. A computer program product comprising:

a computer readable hardware storage device having a computer readable program code embodied therein, said computer readable program code containing instructions that perform contextualizing a page turn in an electronic book pursuant to a snap gesture made by a user on a touch screen of a tablet device, wherein said contextualizing is performed by an e-reader program running in the tablet device, said contextualizing comprising:

quantifying the snap gesture, responsive to receiving the snap gesture via the touch screen, wherein the quantified snap gesture comprises a first data element of direction of the snap gesture (Dr) and a second data element of linger time of the snap gesture (LT), and wherein said quantifying comprises:

detecting a point of contact that initiates the snap gesture on the touch screen at a first point in time T0, wherein the touch screen is a capacitive-resistive type such that the touch screen provides data pertinent to capacity and resistance of the point of contact to the e-reader program;

recording movement of the point of contact, upon determining that the point of contact starts moving at a second point in time T1, while the point of contact exists on the touch screen, wherein T1 is greater than T0 calculating LT as being equal to (T1−T0);

calculating Dr from the recorded movement of the point of contact, wherein the calculated Dr is selected from a group consisting of {forward, backward}; and storing the calculated Dr and LT as the quantified snap gesture such that the e-reader program utilizes the stored Dr and LT in said identifying;

identifying a target page number for the page turn in the electronic book by use of the quantified snap gesture; and displaying, on the touch screen, a target page of the electronic book that corresponds to the target page number from said identifying.

6. The computer program product of claim 5, said quantifying further comprising:

calculating a third data element of distance of the snap gesture (D) indicating a track length made by the point of contact during said recording the movement, that is (T2−T1), wherein T2 is a third point in time on which the point of contact is lost, wherein T2 is greater than T1; and storing the calculated D, Dr, and LT as the quantified snap gesture such that the e-reader program utilizes the stored D, Dr, and LT in said identifying.

7. The computer program product of claim 5, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in sections grouping pages into disjoint sets within the electronic book;

discovering a section turn value corresponding to the quantified snap gesture;

calculating a target section number by applying the mathematical operation corresponding to Dr from said mapping to a current section value and the discovered section turn value, wherein the current section value is a section value being displayed when the snap gesture is received; and selecting the target page number in the calculated target section number pursuant to a predefined manner.

8. The computer program product of claim 5, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in disjoint pages within the electronic book; and discovering a page turn value corresponding to the quantified snap gesture;

calculating a target page number by applying the mathematical operation corresponding to Dr from said mapping to a current page value and the discovered page turn value, wherein the current page value is a page value being displayed when the snap gesture is received.

9. A computer system comprising a processor, a memory coupled to the processor, and a computer readable hardware storage device coupled to the processor, said computer readable hardware storage device containing program code configured to be executed by the processor via the memory to implement contextualizing a page turn in an electronic book pursuant to a snap gesture made by a user on a touch screen of a tablet device, wherein said contextualizing is performed by an e-reader program running in the tablet device, said contextualizing comprising:

quantifying the snap gesture, responsive to receiving the snap gesture via the touch screen, wherein the quantified snap gesture comprises a first data element of direction of the snap gesture (Dr) and a second data element of linger time of the snap gesture (LT), and wherein said quantifying comprises:

detecting a point of contact that initiates the snap gesture on the touch screen at a first point in time T0, wherein the touch screen is a capacitive-resistive type such that the touch screen provides data pertinent to capacity and resistance of the point of contact to the e-reader program;

recording movement of the point of contact, upon determining that the point of contact starts moving at a second point in time T1, while the point of contact exists on the touch screen, wherein T1 is greater than T0 calculating LT as being equal to (T1-T0);

calculating Dr from the recorded movement of the point of contact, wherein the calculated Dr is selected from a group consisting of {forward, backward}; and storing the calculated Dr and LT as the quantified snap gesture such that the e-reader program utilizes the stored Dr and LT in said identifying;

identifying a target page number for the page turn in the electronic book by use of the quantified snap gesture; and displaying, on the touch screen, a target page of the electronic book that corresponds to the target page number from said identifying.

10. The computer system of claim 9, said quantifying further comprising:

calculating a third data element of distance of the snap gesture (D) indicating a track length made by the point of contact during said recording the movement, that is (T2−T1), wherein T2 is a third point in time on which the point of contact is lost, wherein T2 is greater than T1; and storing the calculated D, Dr, and LT as the quantified snap gesture such that the e-reader program utilizes the stored D, Dr, and LT in said identifying.

11. The computer system of claim 9, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in sections grouping pages into disjoint sets within the electronic book;

discovering a section turn value corresponding to the quantified snap gesture;

calculating a target section number by applying the mathematical operation corresponding to Dr from said mapping to a current section value and the discovered section turn value, wherein the current section value is a section value being displayed when the snap gesture is received; and selecting the target page number in the calculated target section number pursuant to a predefined manner.

12. The computer system of claim 9, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in disjoint pages within the electronic book; and discovering a page turn value corresponding to the quantified snap gesture;

calculating a target page number by applying the mathematical operation corresponding to Dr from said mapping to a current page value and the discovered page turn value, wherein the current page value is a page value being displayed when the snap gesture is received.

13. A process for supporting computer infrastructure, said process comprising providing at least one support service for at least one of creating, integrating, hosting, maintaining, and deploying computer-readable code in a computing system, wherein the code in combination with the computing system is capable of performing contextualizing a page turn in an electronic book pursuant to a snap gesture made by a user on a touch screen of a tablet device, wherein said contextualizing is performed by an e-reader program running in the tablet device, said contextualizing comprising:

quantifying the snap gesture, responsive to receiving the snap gesture via the touch screen, wherein the quantified snap gesture comprises a first data element of direction of the snap gesture (Dr) and a second data element of linger time of the snap gesture (LT), and wherein said quantifying comprises:

detecting a point of contact that initiates the snap gesture on the touch screen at a first point in time T0, wherein the touch screen is a capacitive-resistive type such that the touch screen provides data pertinent to capacity and resistance of the point of contact to the e-reader program;

recording movement of the point of contact, upon determining that the point of contact starts moving at a second point in time T1, while the point of contact exists on the touch screen, wherein T1 is greater than T0 calculating LT as being equal to (T1−T0);

calculating Dr from the recorded movement of the point of contact, wherein the calculated Dr is selected from a group consisting of {forward, backward}; and storing the calculated Dr and LT as the quantified snap gesture such that the e-reader program utilizes the stored Dr and LT in said identifying;

identifying a target page number for the page turn in the electronic book by use of the quantified snap gesture; and displaying, on the touch screen, a target page of the electronic book that corresponds to the target page number from said identifying.

14. The process of claim 13, said quantifying further comprising:

calculating a third data element of distance of the snap gesture (D) indicating a track length made by the point of contact during said recording the movement, that is (T2−T1), wherein T2 is a third point in time on which the point of contact is lost, wherein T2 is greater than T1; and storing the calculated D, Dr, and LT as the quantified snap gesture such that the e-reader program utilizes the stored D, Dr, and LT in said identifying.

15. The process of claim 13, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in sections grouping pages into disjoint sets within the electronic book;

discovering a section turn value corresponding to the quantified snap gesture;

calculating a target section number by applying the mathematical operation corresponding to Dr from said mapping to a current section value and the discovered section turn value, wherein the current section value is a section value being displayed when the snap gesture is received; and selecting the target page number in the calculated target section number pursuant to a predefined manner.

16. The process of claim 13, said identifying comprising:

mapping Dr to a respective mathematical operation corresponding to each Dr value, wherein a first Dr value "forward" corresponds to addition (+), and wherein a second Dr value "backward" corresponds to subtraction (−);

determining that the electronic book is organized in disjoint pages within the electronic book; and discovering a page turn value corresponding to the quantified snap gesture;

calculating a target page number by applying the mathematical operation corresponding to Dr from said mapping to a current page value and the discovered page turn value, wherein the current page value is a page value being displayed when the snap gesture is received.

\* \* \* \* \*